United States Patent
Amini et al.

(10) Patent No.: US 6,581,102 B1
(45) Date of Patent: Jun. 17, 2003

(54) SYSTEM AND METHOD FOR INTEGRATING ARBITRARY ISOCHRONOUS PROCESSING ALGORITHMS IN GENERAL MEDIA PROCESSING SYSTEMS

(75) Inventors: Lisa D. Amini, Yorktown Heights, NY (US); Martin G. Kienzle, Briarcliff Manor, NY (US); Jorge O. Lepre, New York, NY (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/321,282

(22) Filed: May 27, 1999

(51) Int. Cl.[7] .............................................. G06F 15/16
(52) U.S. Cl. ...................................... 709/231; 709/236
(58) Field of Search .......................... 370/257; 709/102, 709/202, 231, 238, 302; 703/236

(56) References Cited

U.S. PATENT DOCUMENTS

| | | | | |
|---|---|---|---|---|
| 6,160,796 A | * | 12/2000 | Zou ........................... | 370/257 |
| 6,170,049 B1 | * | 1/2001 | So .............................. | 712/35 |
| 6,216,173 B1 | * | 4/2001 | Jones et al. ................. | 709/302 |
| 6,298,370 B1 | * | 10/2001 | Tang et al. .................. | 709/102 |
| 6,351,762 B1 | * | 2/2002 | Ludwig et al. ............. | 709/204 |
| 6,377,998 B2 | * | 4/2002 | Noll et al. .................. | 709/236 |
| 6,378,066 B1 | * | 4/2002 | Lewis ......................... | 712/236 |

* cited by examiner

*Primary Examiner*—Christine Oda
*Assistant Examiner*—Walter Benson
(74) *Attorney, Agent, or Firm*—Peter Klett; Anne Vachon Dougherty

(57) ABSTRACT

A flexible and efficient mechanism for integrating arbitrary isochronous processing algorithms in general purpose media servers is provided. The disclosed system supports generic graphs of processing modules with for buffer management, distributed stream control, and quality of service management. A data pump component is provided for dynamically creating at least one data path for data retrieved in response to a request, the data path having a plurality of filters for processing the data with one or more processing algorithms. A graph of component then creates a graph for processing data and instructs the data pump to retrieve filters and create the data path in accordance with the graph. By distributing stream control and decoupling resource management from components responsible for processing the media stream, the disclosed system allows these generic graphs to be constructed over multiple, networked systems.

22 Claims, 9 Drawing Sheets

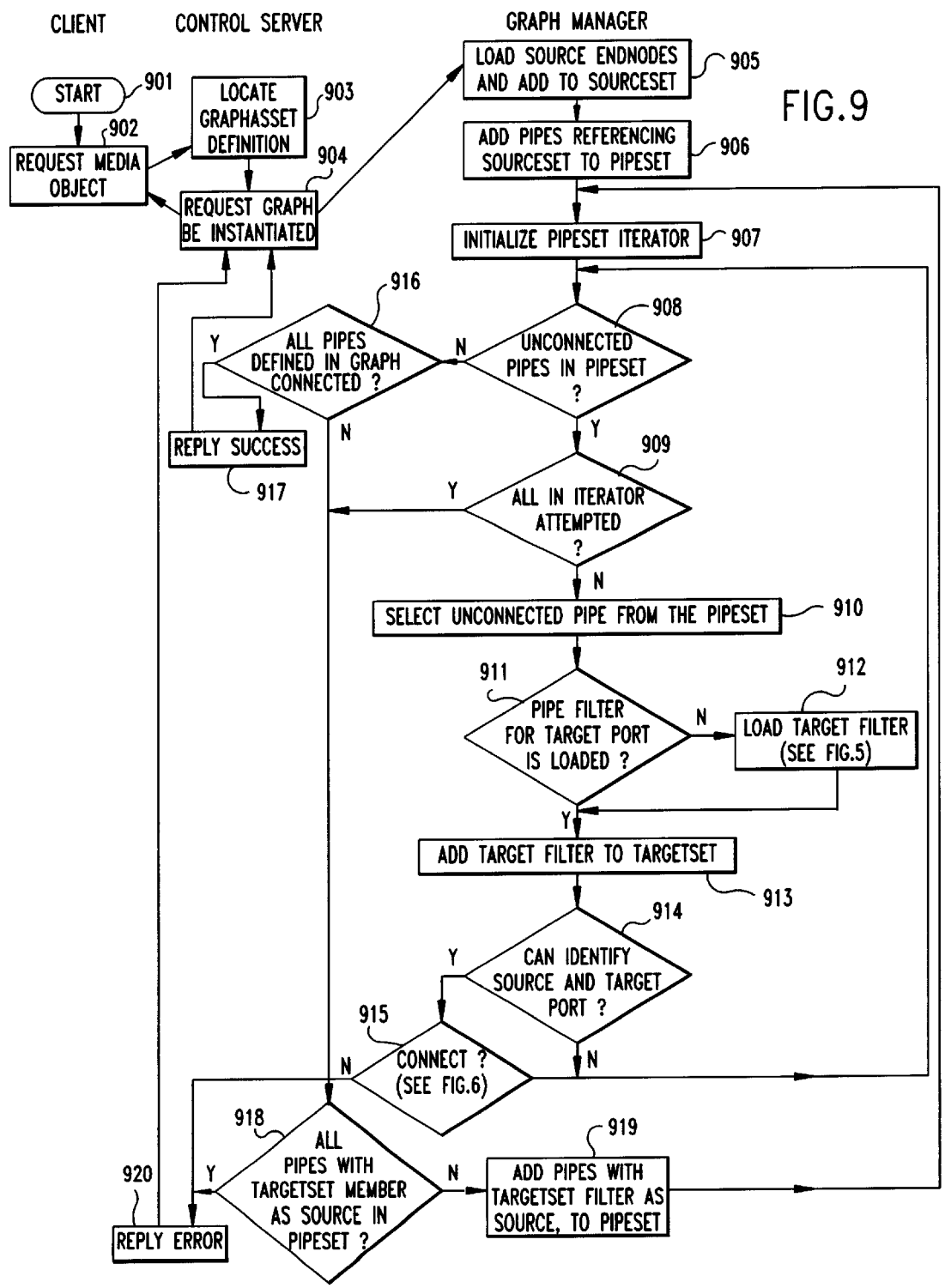

SYSTEM AND METHOD FOR INTEGRATING ARBITRARY ISOCHRONOUS PROCESSING ALGORITHMS IN GENERAL MEDIA PROCESSING SYSTEMS

FIELD OF INVENTION

This invention relates generally to the field of media processing systems and, in particular, to a method and system for integrating arbitrary isochronous processing algorithms into general purpose media processing systems.

BACKGROUND OF INVENTION

Current continuous media systems include servers, which are designed to maximize the number of concurrent streams and to ensure quality of service to those streams which are being serviced, and clients, which are designed to receive media streams and render said streams as a multimedia presentation to the client system user. The problem is that as digital media becomes more commonplace, users require solutions with much greater interactivity. Examples of interactivity requirements in processing media streams include the following: the ability to customize a presentation as it is being presented, both by end-users and by the presenter (or transmitting station) according to the resources available; special security features, including the ability to encrypt or scramble presentations; the ability to watermark individual copies of an audio/video object as it is being transmitted; the loading of certain types of audio/video objects which may require specialized processing so that the object can later be streamed; the extracting of content information from encoded video such as Query by Image Content (QBIC) or speech to 'script' conversions which require preprocessing of video/audio data for later use; implementations of browsing support which may require real-time processing or may require processing by switching between multiple versions of a given audio/video object; and, the ability to adapt the audio/video stream to changing network conditions in ways that do not disturb the end-user.

There are numerous publications describing algorithms to perform some of the foregoing functions including the following: C.-Y. Lin and S.-F. Chang, "Issues and Solutions for Authenticating MPEG Video", January 1999 http://www.ctr.columbia.edu/~sfchang; "Compressed Video Editing and Parsing System (CVEPS)", (itnm.columbia.edu); Ketan Mayer-Patel, Lawrence Rowe (cs.berkeley.edu), "Exploiting Temporal Parallelism for Software Only Video Effects Processing", and, Meng, J., Cheng, S. F., "Tools for Compressed Domain Video Indexing and Editing", SPIE Conference on Storage and Retreival for Image and Video Database., Vol 2670, San Jose, Calif. 1996. There are also publications describing methods for extending programming languages such as Java* (all asterisks indicate that the terms may be trademarks of their respected owners) or C to ease the burden of processing video, such as Smith, Brian. "Dali, A High-Performance Multimedia Processing System", http://www.cs.cornell.edu/dali; and A. Eleftheriadis, "Flavor: A Language for Media Representation", Proceedings, ACM Multimedia '97 Conference, Seattle, Wash., November 1997, pp. 1–9. A problem with implementing prior art solutions is in integrating these algorithms and mechanisms into media processing systems in a generic manner while continuing to adhere to the quality of service provisions required by media processing systems. Existing media processing systems fall into two categories: closed systems which allow no user-written stream processing modules and constrained systems which provide limited interfaces for user-written stream processing modules.

Closed server systems provide the ability to store, manage and stream continuous media files to network connected clients, but do not allow user-written modules to manipulate the media as it is being streamed. Likewise, a closed client system does not allow user-written modules to manipulate the media as it is being received from the server and presented to the client system user. The IBM VideoCharger* Server is a generally available product which is an example of a media server that does not allow user-written stream processing modules. Like many other media servers in this category, the VideoCharger server provides quality of service guarantees. Because media must be streamed at a specific, continuous rate, the server must not attempt to service any client requests which might cause the server to exceed its capacity and thereby degrade the quality of streams which are already being serviced. Thus, in order to provide quality of service guarantees, servers must appropriately manage resources and control admission of new clients. Constrained systems also provide limited support for user-written stream processing modules which may process the media data as it is being streamed or presented. One example of a constrained server is the RealNetworks G2 Server which supports plug-ins. However, these plugins are limited to specific functions such as an interface to a file system, an interface to the network, or file formatting for specific media type. The server does not support an arbitrary series of processing modules. Examples of processing which would benefit from a less restricted environment for processing modules include trick modes, encrypting, watermarking or scrambling streams, and multiplexing or demultiplexing of live streams. This solution is further constrained by the lack of distributed stream control. Also, the server does not provide interfaces for ensuring quality of service for arbitrary processing modules. For example, a plug-in is allowed to choose not to send portions of a media object if it receives feedback indicating the client is unable to process the stream at the current bit rate, however, the capability to limit the number of streams accepted for processing to an amount which can realistically be processed within an acceptable threshold of degradation or while maintaining server stability is not provided.

As another example of a solution which is constrained from the quality of service and distributed stream control perspective, Microsoft* provides the ActiveMovie* (DirectShow*) programming interface and client software. DirectShow does provide a rich programming interface including providing for client processing modules, but does not provide for server-side processing modules. Also, because the interface is geared toward client software, the infrastructure does not address management of a very large number of disparate processing components while maintaining quality of service. Rather, the DirectShow system attempts to dedicate all resources at the client system to providing a single multimedia presentation. Furthermore, because the interface is geared toward client software, control is provided on a filter (a.k.a., module) basis, which would be inadequate for supporting server-side processing and for graphs which are distributed over multiple systems. For example, state control commands, such as pause, are realized on a per-filter basis and the communication interface between filters is limited to notification of changes in filter state. In the server environment, applications will often require stream level control interface, but cannot realistically operate on a per filter basis.

Thus, what is needed is a direct solution to the problem of providing support for arbitrary isochronous processing algorithms in general purpose media processing systems while maintaining the ability for that system to provide quality of service guarantees.

What is further needed is a system and method for dynamically inserting arbitrary processing modules for stream, load and parsing of various media while adhering to the admission control and resource reservation commitments required to ensure quality of service for those streams.

What is further needed is a system and method for allowing these media processing modules to be distributed over multiple systems as required to provide optimal service to interactive multimedia presentations.

SUMMARY OF THE INVENTION

The invention comprises a flexible and efficient mechanism for integrating arbitrary isochronous processing algorithms into general purpose media processing systems by providing an infrastructure and programming model for the dynamic insertion of one or more isochronous processing modules (filters) into a media stream. The method and apparatus will substantially enhance the ability of a media processing system to store and stream various media formats under a variety of conditions. The disclosed system supports generic graphs of processing modules through novel and efficient mechanisms for buffer management, distributed stream control, and quality of service management. The inventive buffer management mechanism ensures that data is efficiently carried through pipelines of filters. The buffering structure and use of pipeline heuristics allows filters to modify data in place, reformat the data, add or remove data from buffers, and duplicate, split or join buffers with minimal copy requirements. The incremental method by which these heuristics are collected and supplied to relevant nodes ensures that information can be easily and accurately retrieved. The distributed stream control mechanism of the present invention allows control commands to be accepted for a given output channel and then for the requested command to be effected at any one or a plurality of filters along the pipeline which is producing data for this output channel. The quality of service mechanism enables abstract representation of resource requirements for arbitrary media objects and their associated processing modules so that admission control, resource reservation and load balancing may be maintained by the server. The generic graphs of processing components provided for in this invention are an essential factor in solving the problem of implementing arbitrary media processing algorithms in a general purpose media server as they provide a method for interconnection of disparate processing components, and they facilitate communication between those components in a way that does not require the components to have full understanding of complex graphs, or even of the directly connected components, and that does not conflict with the time-dependent nature of continuous media data. By distributing stream control and decoupling resource management from components responsible for processing the media stream, the disclosed system allows these generic graphs to be constructed over multiple, networked systems.

BRIEF DESCRIPTION OF THE DRAWINGS

The invention will now be described with specific reference to the attached drawings wherein:

FIG. 9 is a representative process flow for handling a client request.

DETAILED DESCRIPTION OF THE INVENTION

The invention will now be detailed with reference to the appended drawings, with the following terms:

Quality of Service—service level constraints in delivering data to a client. In a networked multimedia environment, client applications require Quality of Service, or QoS, guarantees comprising commitments from one or more server systems, one or more intermediate network nodes and the local system to ensure that end-to-end latency will not exceed a specified level.

Continuous media—data which is processed as a continuous stream. To minimize storage requirements at a client, multimedia data is often delivered as a continuous stream so that it can be processed within a short time of arrival and then discarded. This process of delivering data as a continuous stream is referred to as streaming.

Media server—server which stores continuous media data and accepts requests to stream continuous media data. A media server may stream stored data or may stream data as it is being encoded (e.g., for filing, for delivery, etc).

Isochronous processing algorithms—time-dependent processes which manipulate data as it is being streamed, parsed or loaded. For example, an algorithm which adapts continuous media according to available network bandwidth must perform its manipulations as the data is being streamed and therefore must perform these manipulations in a manner such that latency guarantees are not violated.

Processing modules—software which implements isochronous processing algorithms. This document will use the term "stream processing modules" as well as filters to refer to the processing modules which manipulate media data as it is being streamed.

Graph—an interconnection of stream processing modules which work together to generate a continuous media stream, or group of media streams.

Generic graph—graph of stream processing modules in which the interconnection is constrained by the ability of the collection of modules to produce a decodable stream but not by media processing system imposed constraints, such as the type of processing being performed, or the number of input or output streams.

Controller application—a program which must understand the data and control flow among all stream processing modules, which can be quite complex, within a graph of processing modules.

Buffer—a structure which contains the data component of a media object. Media data is moved through the graph of processing components in the form of buffers.

Figure 1:
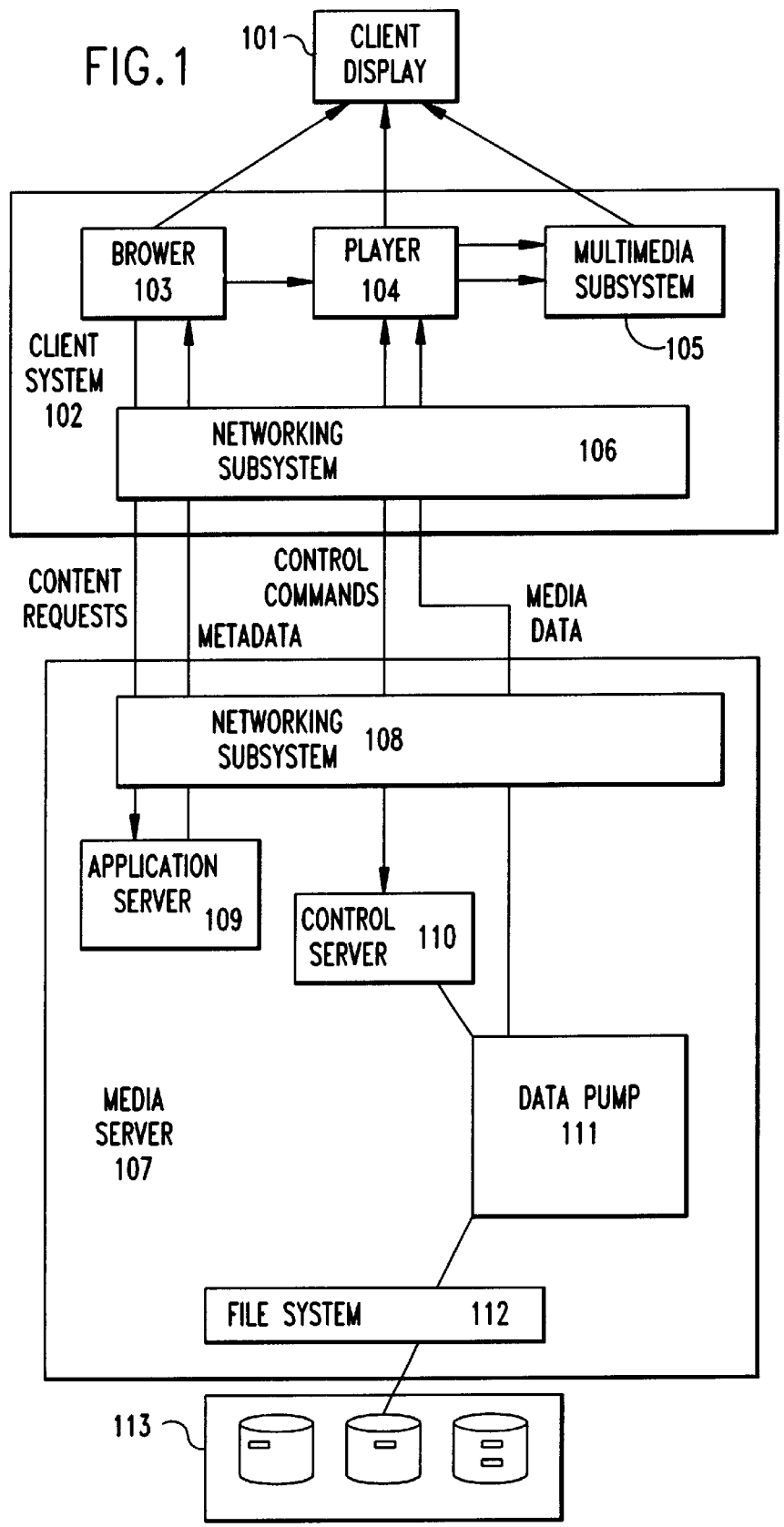
FIG. 1 shows the relationship of components of a media server and a multimedia client.

Referring first to FIG. 1, there is shown in block diagram form, a media server (107) which is serving content to a client system (102) over a network connection. The media server includes an application server (109) component which provides an interface through which a client may request content and receive metadata in response to these content requests through a browser (103). The browser passes this metadata to the client player (104) which uses the metadata to establish a control session to the control server (110) component. The control server translates player requests received on the control session into actions performed in the data pump (111) component. The data pump is responsible for extracting media data from a device such as a file system (112), encoder device, or network connection, and sending the data to the client as an ischronous stream through a network subsystem (108). The method described in this disclosure is not tied to a specific type of resource management mechanism. Instead, the idea is to provide the appropriate information to the resource manager so it can use the appropriate method to manage server resources. In this document, the subsystem which supports the filter infrastructure and is responsible for streaming media objects will be referred to as the datapump. The preferred embodiment of this invention decouples the system resource management component from the datapump component so graphs can be constructed over multiple systems while continuing to have resources managed. The player translates control command responses into actions which are performed in the multimedia subsystem (105). The player also receives media data from the networking subsystem (106) and forwards this data to the multimedia subsystem to be decoded and then rendered on the client display (101). Processed data may alternatively be retrieved from an encoder device or retrieved from a network connection and may be provided to a decoder device or may be provided directly for filing.

Figure 2:
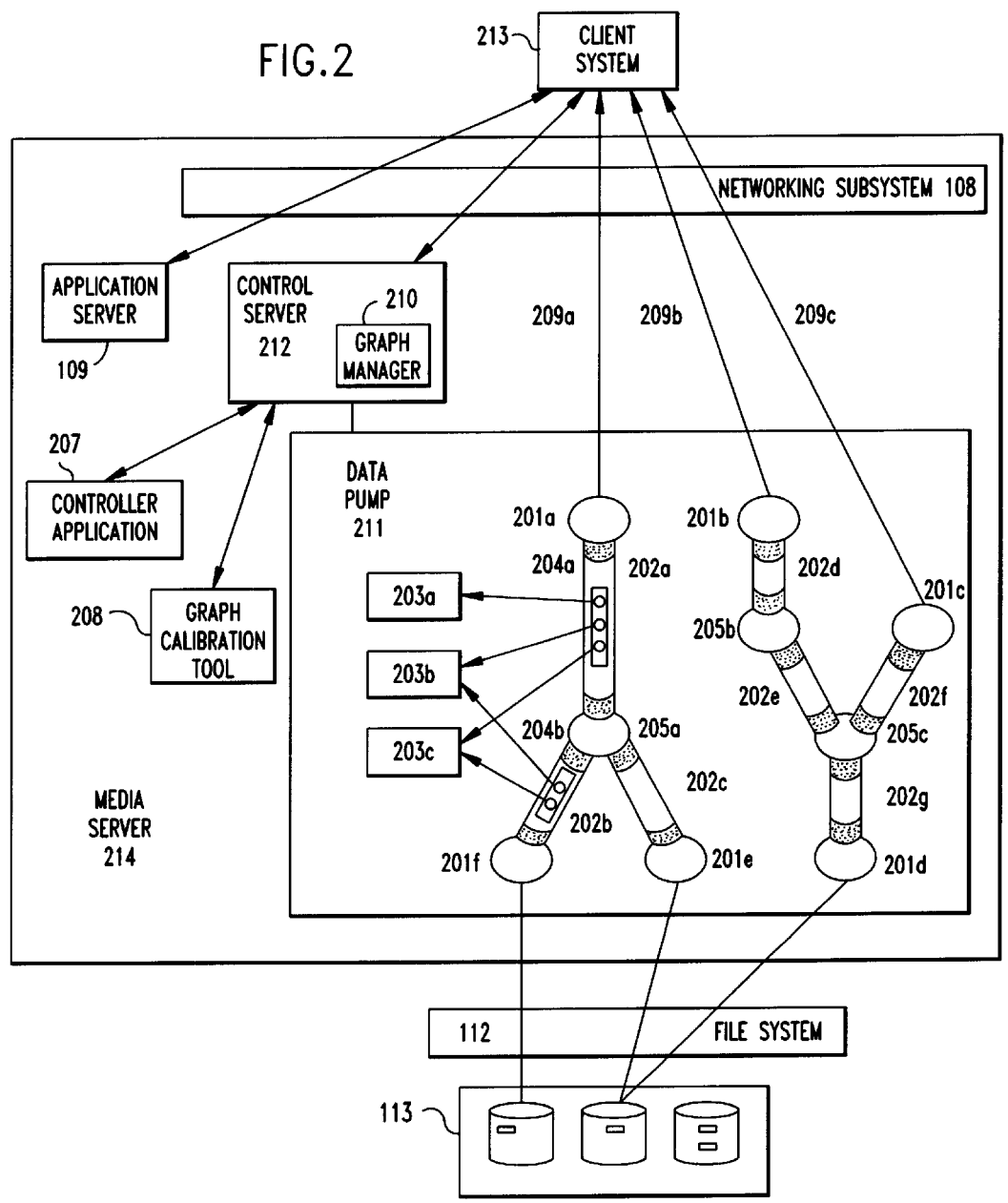
FIG. 2 shows how processing components are integrated into the multimedia client server environment.

Referring now to FIG. 2, there is shown in block diagram form, a media server (214) and client system (213) of the preferred embodiment of the present invention. In accordance with the present invention, the datapump (211) now provides support for generic graphs of user-written processing modules which may be dynamically inserted into the media stream. The novel distributed stream control and quality of service mechanisms of the present invention support having this graph of processing modules distributed over multiple systems, including the client system. For clarity, the graph illustrated in FIG. 2 is instantiated in a single system, specifically, the media server system.

This invention provides support for custom, intelligent controller applications (207) which can be written to instantiate and control a graph of processing components. This invention also provides for a graph creation and calibration tool (208) so that a general purpose graph builder, which knows only which filters are to be loaded and which ports are to be connected, can instantiate the graph. A port is a named connection point of a filter which is identified by a filter for the purpose of establishing a connection, or pipe, between the identifying filter and some other filter. Ports names are filter-unique and are referred to throughout this document as port labels. Predefined graphs created through said tool ensure that an end-user, interfacing to the server through the client system, is able to set up and control the stream through a standardized stream control protocol, without the need for intelligent controller applications. A graph comprises end nodes (201a, 201b, 201c, 201d, 201e, 201f), filters (205a, 205b, 205c), and pipes (202a, 202b, 202c, 202d, 202e, 202f, 202g) which are associated with input and output ports between filters. In the preferred embodiment, some filters are provided as part of the media server, but filters may also be user-written. An end node is a specific type of filter which may attach to only one input port or one output port and which encapsulates the interface to devices external to the data pump. Thus, a graph logically comprises nodes (filters) and directed edges (pipes). A pipe may maintain a queue of buffers (204a, 204b) which may reference internal data buffers (203a, 203b, 203c).

The term output channel (209a, 209b, 209c) is used to refer to the connection to the target end node of a graph. Data which flows through an output channel will flow out of the system to a target external to the system. FIG. 2 depicts a client system as a target external to the server system, but files are also examples of targets which are external to the system. All filters and pipes through which data passes on its path to a specific output channel are considered to be on the pipeline attached to that output channel.

All filters, including system-provided filters, user-written filters and end nodes, are invoked at the request of the graph manager (210), working from a predefined graph or at the request of a controller application. When working from a predefined graph, the graph manager provides a simplified implementation of a controller application which loads the graph from its definition and controls the components by applying client control commands directly to output channels. Media objects can be defined to the server by an administrator so that the graph manager can instantiate a graph at the request of the client using parameters defined by an administrator. The media object definition may reference some number of filters which should be used to stream, load, or parse that media object. If a filter is referenced in a media object definition, that media object is referred to as a GraphAsset. A GraphAsset definition includes a list of nodes and pipes, where a node represents a filter and an pipe represents a connection between two ports of two filters. Each node in the GraphAsset may have filter-specific initialization information associated with the node which will be provided to the filter at initialization, by the graph manager. If a node is an end node, device access information such as a filename, the network address of the source or target device or device name will be specified for that end node. Pipes are defined by the filter name and the port label which has been defined for the source and target ports to be connected to form the pipe. A pipe connects one input port to one output port. A pipe forms a generic interface through which filters will communicate data and control. Control commands are communicated in the upstream direction. Data is communicated in the downstream direction in the form of buffers. A buffer may also carry information indicating whether a specified control command is being effected for the data referenced by this buffer so that the command may be effected at each node as it traverses the pipeline in a downstream direction.

FIG. 9 illustrates the process of loading and connecting a filter graph in response to a client request. Note that in the flow block diagrams provided in this disclosure, arrows with solid lines represent control flow within a single component whereas, arrows with dashed lines represent control flow from one component to another. In response to a client request, either a controller application or graph manager can be invoked to service the request. In the illustrated process flow, the graph manager is providing a simplified implementation of a controller application by building the graph from it's GraphAsset definition. Once the graph is built, the graph manager will control the graph components by applying client control commands directly to output channels. The process begins (901) when a client requests a media object (902). This request is received by the Control Server (903) and a request for instantiation of the graph is made at 904. The graph manager component of the Control Server is responsible for loading and connecting the graph components based on the definition of nodes and pipes within the GraphAsset definition (904). At any time while the graph manager is attempting to instantiate a graph, the set of nodes which have been loaded and have source ports which are referenced by pipes in the GraphAsset definition will be termed the "SourceSet". Likewise, the set of nodes which have been loaded and have target ports which are referenced by pipes in the GraphAsset will be termed the "TargetSet". Note that filters which are not end nodes will be members of the SourceSet and the TargetSet. Pipes which are currently being considered for connection by the graph manager are said to be in the "PipeSet".

Figure 5:
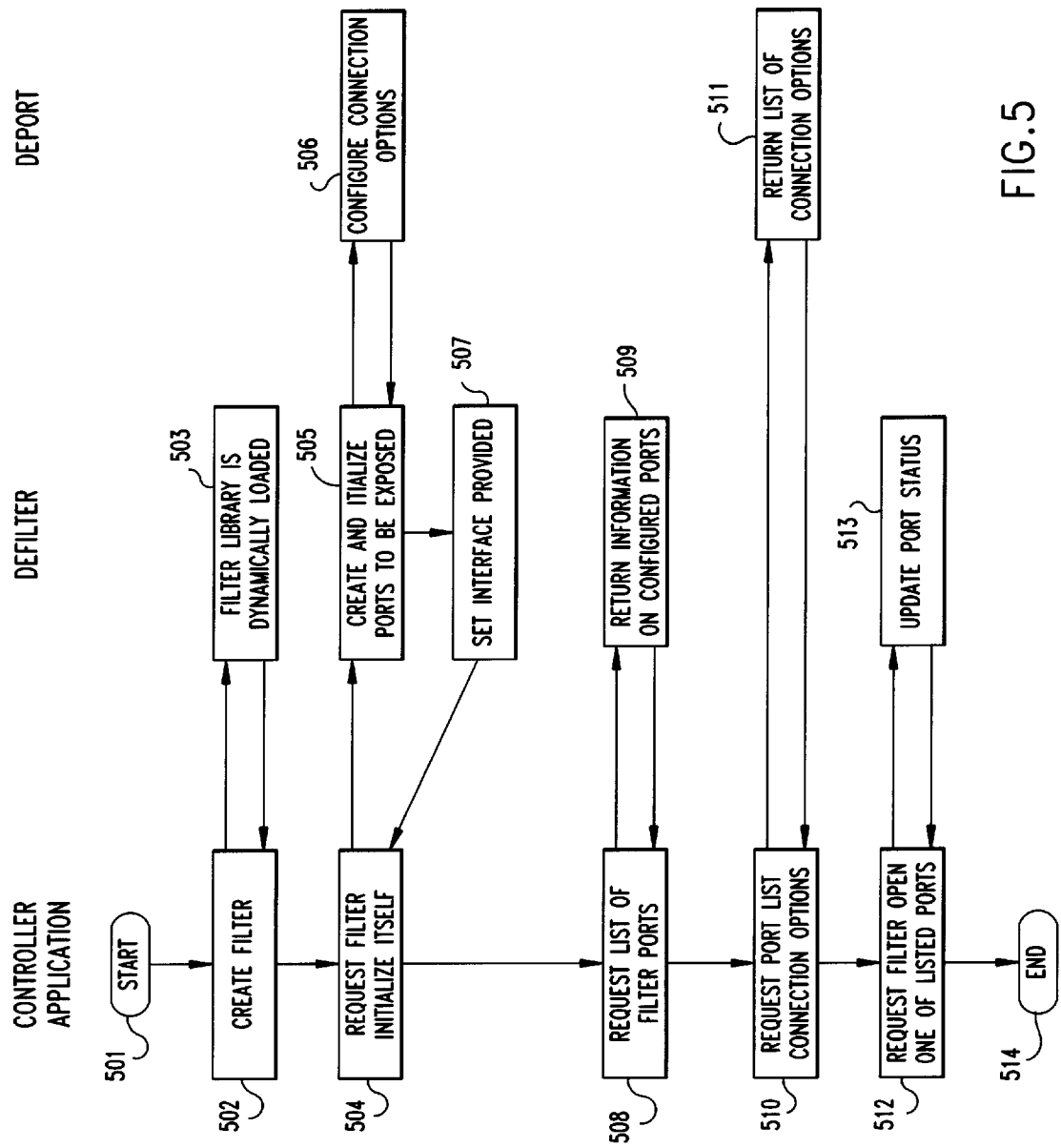
FIG. 5 shows the flow of control when a filter is created and initialized.

In instantiating a given GraphAsset, the graph manager first loads the source end nodes (905). Therefore, the first set of nodes to be added to the SourceSet are the source end nodes. For each pipe with a source port which references a node in the SourceSet, the graph manager will add the pipe to the PipeSet (906). The main processing loop for attempting to connect all pipes in the graph begins with initializing an iterator for the PipeSet (907). The term iterator is used to refer to a programming construct such as an ordered list or stack wherein each pipe in the PipeSet will be individually considered for connection, until each in the list has been considered. The beginning of this main processing loop is reached each time new pipes are added to the PipeSet. If there is an unconnected pipe in the PipeSet (908) which has not yet been attempted in this iteration (909), the graph manager will select this pipe from the PipeSet (910) and attempt a connection. To attempt a connection, the graph manager ensures the target filter has been loaded (911, 912) and adds the target filter to the TargetSet (913). When a filter is started and initialized, it identifies one or more input and/or output ports which can be used to establish connections to other filters. The port encapsulates the connectivity options of a particular filter. The details of creating and initializing a filter are illustrated in FIG. 5 and will be described later in this document. The graph manager will query the connection options and use this information when instantiating a graph. By allowing filters to identify additional input or output ports once a port is connected, filters can support a variety of media types and subtypes while not complicating their abstraction to the graph manager.

Referring back to FIG. 9, the graph manager requests a list of ports from the source and target for the selected pipe to determine whether the port label referenced in the pipe is available (914). Note that because a given port of a filter may not be identified until certain other ports are connected, the graph manager may not be able to connect all pipes in the PipeSet until all graph components are loaded. However, if the filters and ports referenced by the pipe are available, the connection is attempted (915). The process of establishing the connection is illustrated in detail in FIG. 6 and is discussed later in this document. If the connection is established, or if the referenced ports are not yet available, the graph manager will move to the next pipe in the PipeSet iteration. If the connection request fails, the graph setup is terminated and a error reply is generated (920). As the graph manager is iterating through the PipeSet, if there are no unconnected pipes remaining in the PipeSet (908), the graph manager will check whether the graph is completely loaded (916). If the graph is completely loaded, the graph manager will return a success reply (917). If not, the graph manager will determine if there are filters in the TargetSet which also serve as source filters (918). If the pipe which references a filter as a source node in the TargetSet is not already in the PipeSet, it is added (919) to the PipeSet and the filter is added to the SourceSet. The graph manager then loops back to the start of the main processing loop and resets the iterator to the beginning of the PipeSet. If all pipes referencing filters in the TargetSet are already in the PipeSet, the graph setup is terminated and an error reply is generated. FIG. 9 illustrates that the graph manager will repeat the process of identifying new members of the SourceSet, TargetSet and PipeSet, and attempting to connect members of the PipeSet until one of the following conditions occurs: all edges have been connected, an error occurs in attempting to connect an pipe, or all filters referenced in the GraphAsset have been loaded but the graph manager is unable to connect any additional members of the PipeSet. If all pipes have been connected, the graph manager sends a success reply. Otherwise, an error reply is sent to the client.

Figure 3:
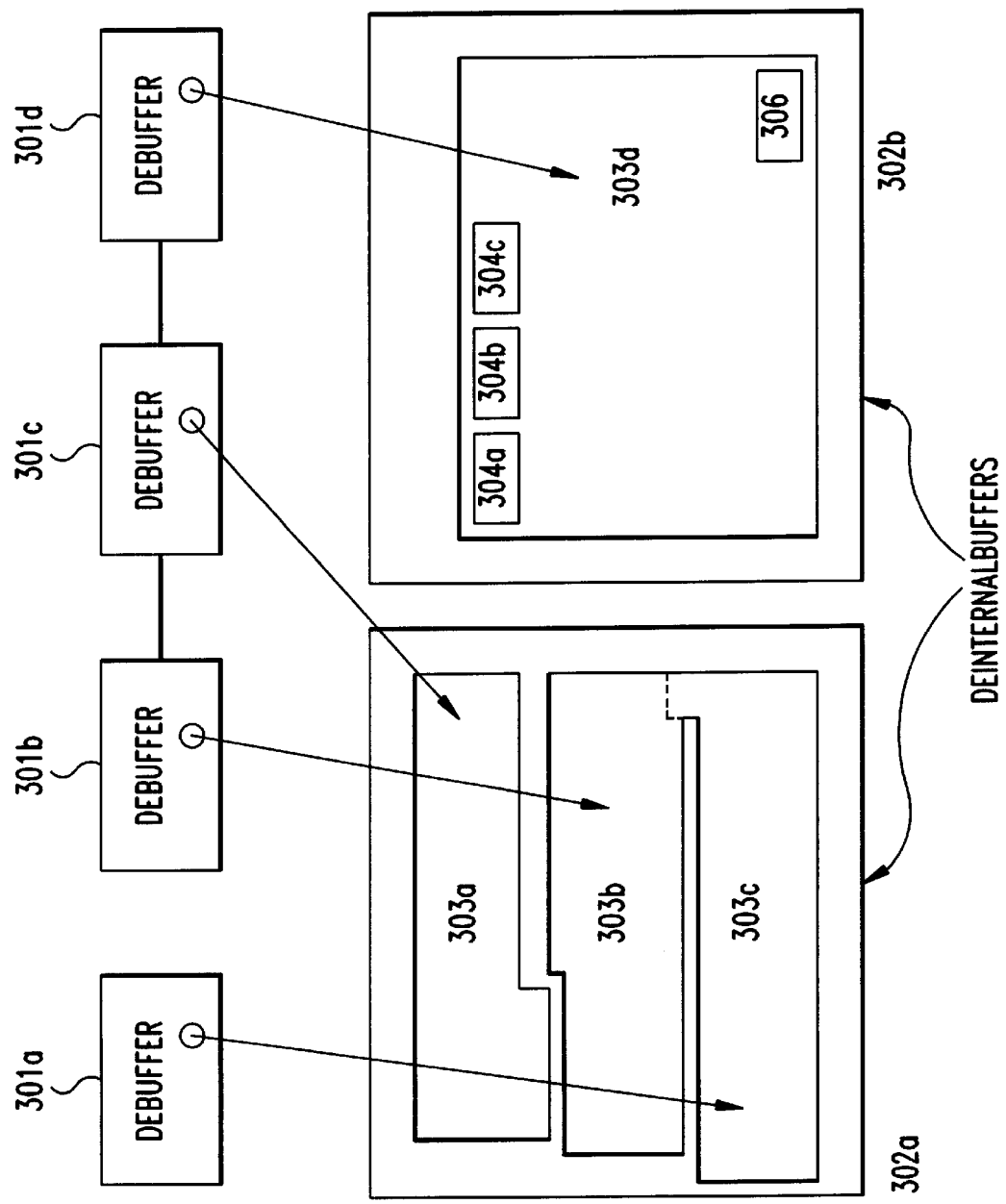
FIG. 3 shows the structure of the buffers which house the media data as it flows through the system.

With this understanding of the relationship among components of the present invention, the inventive buffer management mechanism can now be described. Data is carried through the pipeline in the form of buffers. As these buffers flow through the pipeline, filters may need to change the data in place, reformat buffers, and add or remove data from the buffers. The volume of media data that must flow through filters ranges from tens of kilobits per second to tens of megabits per second. Also, the rates at which the media data must flow may be constant or variable. Because of the potentially high volume and isochronous nature of the media data, a key feature of this invention is a method for ensuring that minimal delay is introduced as the data flows through the pipeline. Specifically, when data is introduced into the media server, it is placed in an internal buffer (deinternalBuffer) which is then linked to an abstraction of the data in that buffer (deBuffer). Referring now to FIG. 3, the relationship between deInternalBuffers (302a, 302b) and deBuffers (301a, 301b, 301c, 301d) is illustrated. An internal buffer may be referenced by one or more deBuffers. Each of the deBuffers referencing an internal buffer may point to the same data, or to a subset of the data or to different offsets within the data. Block 303b and 303c represent internal, overlapping regions of deinternalBuffer (302a) which are referenced by deBuffers (301a and 301b, respectively). The internal region (303d) of deInternalBuffers (302b) illustrates how headers (304a, 304b, 304c) and trailers (306) can be appended to file data as the buffer is processed by a filter. If data arrives at a filter in multiple buffers, even if the buffers arrive on different pipes, the data can be chained, by setting flags on the buffers, into a single logical buffer, without copying the data within those buffers. Blocks 301b, 301c, 301d of FIG. 3 depict data which is split over multiple internal buffers but chained so it can be sent as a single packet of data.

This representation of media data is the starting point for enabling efficient operations on media data. In order for these operations to be carried out efficiently, the source end nodes must make intelligent decisions about how data is initially placed in buffers so that even under conditions whereby the data is significantly altered by filters as it traverses the pipeline, minimal or no data copy is required. Part of the buffer management of the present invention includes a mechanism to characterize the pipeline through which buffers of data will be sent. By characterizing the pipeline, heuristics are provided to the source end node so it may simply, and appropriately place data in buffers for maximal efficiency.

The following information is conveyed to source node and client when the pipeline is characterized: a unique identifier of the output channel to which the pipeline is connected; delivery options (including framed access, and reliable delivery); maximum packet size; preferred buffer size; preferred header reserved; preferred trailer reserved; peak bit rate; average bit rate; valid commands; and pipe id and associated queue depth. With this information, the source node will best determine how to bring data into the pipeline.

Figure 4:
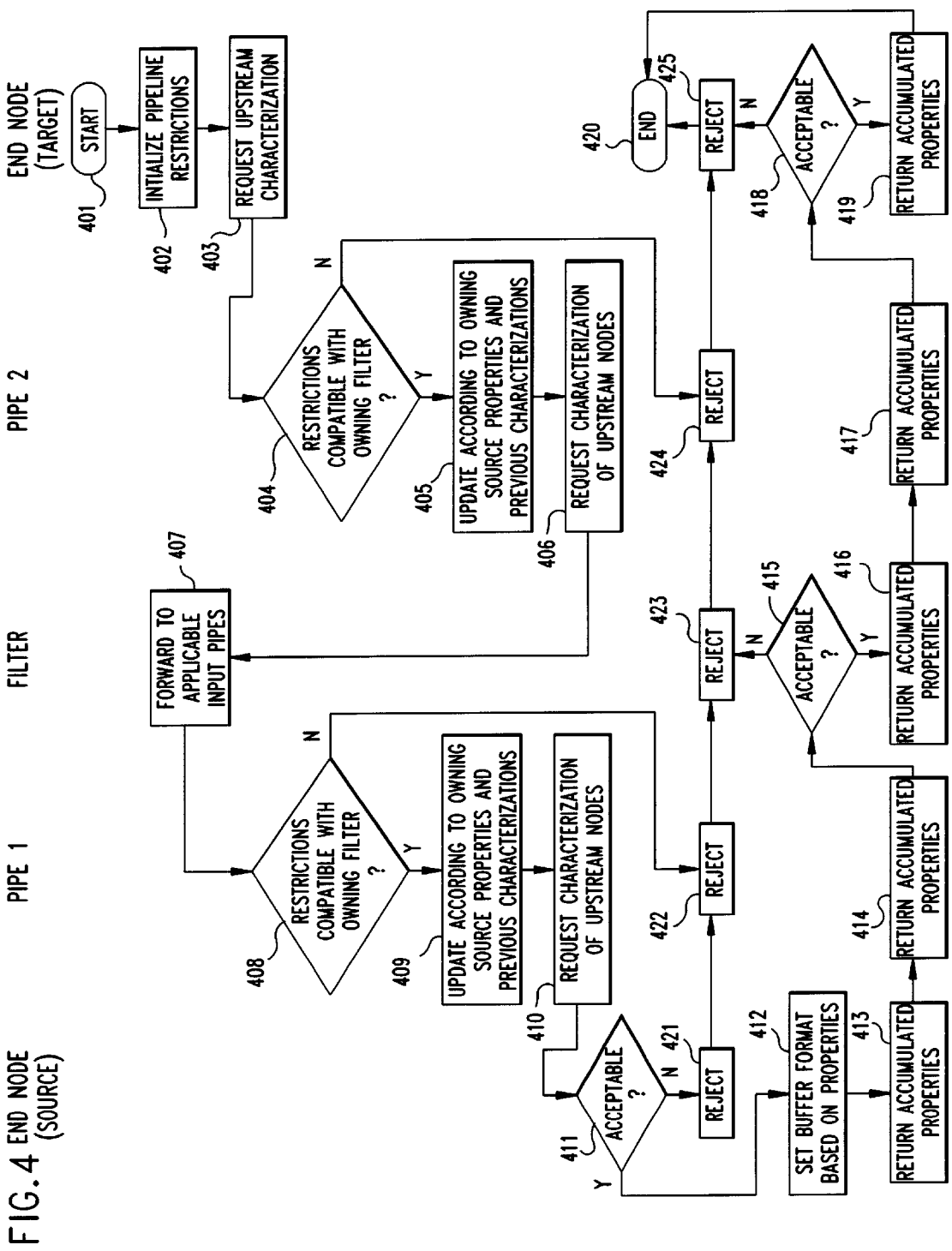
FIG. 4 shows the flow of control when a pipeline is characterized.

FIG. 4 illustrates the flow of control when a pipeline is characterized. The process begins (401) at the target end node which initializes the pipeline properties with information about the link to which the pipeline is connected (402). Information initialized by the target end node includes whether the access is framed and/or reliable and the packet size which will be sent to the client. A framed connection is one in which the client receives the entire packet or none of the packet, but never receives a partial packet. A reliable connection is one in which the client will receive all packets. The end node invokes the characterize pipeline request (403) on its input pipe by first ensuring, at 404, that the restrictions are compatible (404) with its local characterization information initially provided by the owning filter when the pipe was created. If incompatible, the request is rejected (424). If compatible, the pipe updates local characterization information (405). Local characterization information is used to ensure that subsequent pipeline characterizations, initiated from different target end nodes, do not violate earlier characterizations. The pipe then forwards (406) the characterization request to the upstream owning filter which forwards the request (407) to any input pipes through which data will be routed to the requesting pipe. Each pipe repeats the process of validating the characteristics (408), updating local information (409) and forwarding the request upstream (410). The property information may be modified (for example, the cumulative header space increased) as the request flows upstream. As the request returns (downstream), filters and pipes along the pipeline can realize the settings and may decide to reject the characterization, but they may not alter the properties. This directional aspect is important in realizing the pipeline properties. For example, when considering the valid commands property, it is to be noted that because commands are applied to the output channel and then propagated upstream, the accumulation of information regarding which commands are supported must also flow in the upstream direction.

When the characterization request reaches the source end node, the source end node ensures that the characteristics can be supported (411) and rejects the request if not (421). Note that the rejection flows back through each of the components of the pipeline (422, 423, 424, 425). In this manner, the pipeline characterization winds its way up to the source end node(s) and then returns back to the target end node. At each pipeline stage, the pipe incrementally validates the pipeline properties in the context of the current graph to ensure a consistent pipeline. With this information, the source end node will best determine how to bring data into the pipeline. Given the results of the pipeline traversal the target end node may modify the characterization and pass it through the pipeline again, until it is not rejected by any entity, or until the unlikely event that the target end node runs out of options. Once the characterization has been returned without any rejections, the source end node will have a holistic view of how buffers of data will be treated as they traverse the pipeline. The source end node can then place data in buffers within the size limits of downstream filters. By using standard operating system scatter read operations, the server can continue to request very large data transfer operations from source devices and thereby continue to maximize bus and device efficiency, while providing data in units which can be efficiently handled by processing filters. By ensuring the buffer size and data offset accommodates planned headers and trailers, data need not be copied to append the required headers and trailers. Once the pipeline has been characterized, data may begin to flow on the pipeline. Data is placed in buffers at the source node, carried through filters on the pipeline and then sent to the target device by the target end node. The buffer is passed among filters on the pipeline as an object.

Before continuing with the detailed flow diagrams representing the distributed stream control mechanism of the present invention, an understanding of the programming interfaces defined in the preferred embodiment is essential. For clarity, this programming interface is described in terms of C++ objects although the interface is in no way dependent upon features of the C++ language. To implement an algorithm for use by a general purpose media processing system, the filter writer will implement a deFilter. The filter writer may also implement a dePort to describe the connectivity options, such as the media types and subtypes is it capable of handling. This filter will be exposed to other components of the system through dePipes and deBuffers.

The interfaces exposed by the dePort object are as follows:

```
class dePort : public deObject {
protected:
    // called at setup to set types of connections supported; derived class
    // should override to limit types of connections supported
    virtual int setConnectOptions( );
    // determines if a compatible set of connect options exists
    virtual int findCompatible(slist *peerOptions,
        deConnectAttrs *recommended);
public:
    // constructor
    dePort(deFilter *owner, uint_t portType, msPortLabel_t *label);
    // initialization required
    virtual int initialize_object( );
    // return port type
    static const uint_t DE_PORT_INPUT;
    static const uint_t DE_PORT_OUTPUT;
    uint_t getPortType( );
    // invoked by initialization to set acceptable types of connections.
    // Derived classes may override to customize acceptable connections.
    virtual int initConnectOptions( );
    // returns list of acceptable connection options
    virtual int enumConnectOptions(slist list);
    // current settings for stream being channeled through this port
    virtual int getConnectAttrs(deConnectAttrs *attrs);
    virtual int setConnectAttrs(dePort *peerPort, deConnectAttrs
        *attrs)=0;
    // called to establish peer relationship
    virtual int connect(dePipe *ownPipe, dePort *peerPort)=0;
    // called when disconnect requested
    virtual int close(deObject *caller);
};
class deOutPort : public dePort {
public:
    deOutPort(deFilter *owner, msPortLabel_t *label);
    virtual int setConnectAttrs(dePort *peerPort, deConnectAttrs *attrs)
    { return DE_ERROR_NO_SUPPORT; }
    // called by the pipe to intiate peer relationship
    virtual int connect(dePipe *ownPipe, dePort *peerPort);
};
class deInPort : public dePort {
public:
    deInPort(deFilter *owner, mnsPortLabel_t *label);
    virtual int setConnectAttrs(dePort *peerPort, deConnectAttrs *attrs);
    // called by peer port to establish complete
    virtual int connect(dePipe *ownPipe, dePort *peerPort);
};
```

Although filter writers may choose not to implement a dePort object, and thereby accept any valid connection request, the dePort object allows filter writers to customize the connections that a port can participate in by overriding the initConnectOptions method. The initConnectOption method is called when the port object is initialized. Each port is identified by a filter-unique port label. Filter writers may choose to override the findCompatible method and thereby implement mechanisms which are more flexible in determining whether a given connection is suitable. The port object is created by the filter which is exposing this port.

The dePipe object is provided by the media processing system to off load the complexity of the graph and interconnections between processing modules from the filter writer. Filter writers will call methods of the dePipe object to communicate with other filters. The interfaces exposed to filter writers by the dePipe object are as follows.

```
class dePipe : public deObject
{
public:
    // constructor
    dePipe(deOutPort *srcPort, deInPort *tgtPort);
    int initialize_object( );
    int open( );
    int close ( );
    // called by source filter to initialize pipeline characteristics
    int setLocalPipelinePreferences(deNode *caller,
            dePipelineProperties *props);
    // CharacterizePipeline is initiated by the target end node when
    // the pipeline is fully connected for this output channel.
    int characterizePipeline(dePort *caller,
        dePipelineProperties *props);
    // modifies pipeline properties to support requirements of local filter
    virtual int syncPipelineProperties (dePipelineProperties *local,
            dePipelineProperties *pipeline);
    // called by source filter to indicate how buffers are to be retrieved
    int setPullMethod(int (* filterPull) (. . .));
    // retrieve a buffer from the peer filter
    int pullBuffer(deBuffer **buf, deOffset_t offset, size_t size);
    // add/delete reference to a control linked pipe
    int addControlLink(dePipe *cp)
    int deleteControlLink(dePipe *cp)
    // called by filter to request random access to media
    virtual int setRandomAccess(deObject *caller);
    // handle control messages from client which are not defined to server
    int control(size_t sizeIn, caddr_t dataIn, size_t sizeOut,
            caddr_t dataOut);
    int controlNotify(size_t sizeIn, caddr_t dataIn, size_t sizeOut,
            caddr_t dataOut)
    // server defined control messages
    int pauseatpos(int mode, int entry, deOffset_t offset);
    int seekatpos(int mode, int fromentry, deOffset_t fromoffset,
            int toentry, deOffset_t tooffset);
    int play(struct timeval *playAt);
    int shuttle(long numerator, unsigned long denominator);
    int setScale(scale_t scale);
    int flush( );
    // event notification
    int pauseNotify(int mode, int entry, deOffset_t offset);
    int seekNotify(int mode, int fromentry, deOffset_t fromoffset,
            int toentry, deOffset_t tooffset);
    int playNotify(struct timeval *playAt);
    int shuttleNotify(long numerator, unsigned long denominator);
    int setScaleNotify(scale_t scale);
    int flushNotify( );
};
```

The dePlayThread object is provided by the media processing system. Filter writers can create a separate thread to retrieve, process and queue buffers for delivery to downstream nodes. For example, if asynchronous operation is specified on a connection between 2 filters, the filter can create a playthread and use the assignTarget to assign the target pipe to this thread. The filter will also use the setPullMethod of the playthread to indicate to this thread the method to invoke to retrieve buffers. The playthread will monitor the target pipe to determine when the pipe is able to accept data. When the pipe is able to accept data, the playthread will use the assigned pull method of the filter to retrieve and process data, and then push this data into the pipe. When the pipe is not available to accept data, the playthread will wait for a change in the pipe state before retrieving additional buffers. A play thread can serve as the conduit between a filter and one or more pipes. The interfaces exposed to filter writers by the dePlayThread object are as follows.

```
class dePlayThread : public deObject {
public:
    // assign a target pipe to which data will be pushed
    int assignTarget(dePipe *pipe);
    // specify the method through which filter data can be retrieved
    int setPullMethod(int (*filterPullMethod) (. . .));
    // control thread
    int play( );
    int pause( );
};
```

The deBuffer and deInternalBuffers objects are provided by the media processing system. Filter writers will call methods of the deBuffer object to process the data contained in a deBuffer. The interfaces exposed to filter writers by the deBuffer object are as follows.

```
class deBuffer : public deObject
{
public:
    // possible stream flags
    static const uint_t    CLEAR;
    static const uint_t    PAUSE_IN_BUFFER;
    static const uint_t    SEEK_IN_BUFFER;
    static const uint_t    FIRST_BUF_OF_FILE;
    static const uint_t    END_OF_FILE;
    static const uint_t    END_OF_STREAM;
    static const uint_t    INVALID_BUFFER;
    static const uint_t    END_OF_ENTRY;
    static const uint_t    FIRST_BUF_AFTER_SEEK;
    static const uint_t    FIRST_BUF_AFTER_SETSCALE;
    static const uint_t    FIRST_BUF_AFTER_SETSPEED;
    static const uint_t    FIRST_IN_CHAIN;
    static const uint_t    LAST_IN_CHAIN;
    static const uint_t    ONLY_IN_CHAIN;
    static const uint_t    CHAINING_MASK;
    static const uint_t    ATOMIC;  // indicates packet cannot be split
    // initialize
    int init(size_t size, uint_t flags, int startPad=0);
    int init(deBuffer *buffer);
    // get the size of data referenced in buffer
    size_t getSizeData( );
    deOffset_t getOffsetFile( );
    deOffset_t getSizeDataFile( );
    deOffset_t getStartDataFile( );
    // get exclusive access, return real start address of data
    caddr_t getPtrData( );
    // release exclusive access
    void releasePtrData( );
    // operate on flags
    void setFlag(uint_t flag);
    // split the buffer at the given offset, original will contain first
    // part, buffer referenced as part2 will contain second half
    int split(size_t splitAtOffset, deBuffer **part2);
    // reduce buffer by shifting start offset or size
    int clip(size_t offsetShift, size_t sizeShift);
    // check if given file offset reside in this buffer
    int doesContain(deOffset_t offset);
    // add trailer
    int append(const char *sourceAddr, size_t copyLength, int
    isFileData=0);
```

```
// insert header
int prepend(const char *sourceAddr, size_t copyLength,
    int isFileData=0);
// compare data in buffer
int compare(const char *compareAddr, size_t compareOffset,
    size_t compareSize);
};
```

The deFilter class is the base class for all filters. The deInlineFilter provides a base for the simplest filter, namely a filter with a single input port and a single output port. When a buffer is requested via pullBuffer, the deInlineFilter retrieves a buffer from the upstream node, performs the required processing, and then returns the buffer to the caller. Depending on the connection requested, buffers may be processed and then queued by a filter thread, or processing may be performed on the downstream filter's pullBuffer thread. The deFilter and deInlineFilter classes are defined so filter writers need only implement the processBuffer method to implement their algorithm. Additionally, other interfaces can be overridden so filter writers can provide more sophisticated functions, such as multiplexing the data from multiple input ports to a single output port or demultiplexing data from a single input port to multiple output ports. A filter is created and initialized at the request of a controller application or graph manager. The filter writer implements any interfaces to be overridden in a dynamically linked library (dll) which is loaded when a request to create the filter object is received.

Interfaces exposed by the deFilter are as follows:

```
class deFilter : public deObject
{
protected:
    // overridden by derived class to customize
    // filter support.
    virtual int setInterfaces( )=0;
    virtual int initPortOptions( )=0;
    virtual int init( );
    virtual int setLocalPipelinePreferences( );
public:
    // initialization required; will be called
    // before any other calls to this object
    virtual int initialize_object(char *initializationInfo);
    // initialize pipeline information
    // CharacterizePipeline is initiated by the target end node when
    // the pipeline is fully connected for this output channel.
    virtual int characterizePipeline(dePipe *caller,
            dePipelineProperties *props)=0;
    // Interfaces exposed
    static const uint_t DE_STREAM_INTERFACE;
    static const uint_t DE_PARSE_INTERFACE;
    static const uint_t DE_LOAD_INTERFACE;
    // returns information on which interfaces (stream,load,parse)
    supported
    int getInterfaces( );
    // returns information on filter properties
    int getProperties(deFilterProperties *props);
    // Returns list and types of output ports available on this filter
    int enumPortOptions(filterPort_t *ports, int size, int *count);
    // opens a port to the filter
    virtual int openPort(filterPort_t *id,
        msNetworkParms_t *parms, rate_t bitrate,
        deHandle_t *pHandle);
    // close a port to the filter
    virtual int closePort(filterPort_t *id);
    // interface for receiving pipeline statistics
    virtual int processStatistics(deStatistics_t *stats);
    virtual int setStatisticsSink(deObject *statSink);
    // accepts control messages from controller application
    virtual int control(size_t sizeIn, caddr_t dataIn, size_t sizeOut,
            caddr_t dataOut);
    // called for each buffer that passes through this filter
    virtual int processBuffer(deBuffer *buf)=0;
    // disconnect is called by port to indicate port is being disconnected
    static const uint_t     DE_DISCONNECT_IMMED;
    static const uint_t     DE_DISCONNECT_DRAIN;
    virtual int disconnect(dePort *port, uint_t flags=DE_
        DISCONNECT_IMMED);
    // called by pipe to indicate downstream filter requests random access
    virtual int setRandomAccess(deObject *caller);
    // notification of status change return error code
    static const uint_t     DE_STATUS_STOPPED;
    static const uint_t     DE_STATUS_STARTED;
    virtual uint_t getStatus( );
    // control commands called by pipe to indicate the action has been
    // performed on the pipe. Derived classes may override to collect
    // filter-dependent statistics or implement specialized behavior based
    // on the completion of the action on this downstream pipe.
    virtual int pauseNotify(dePipe *caller, int mode, int entry,
            deOffset_t offset);
    virtual int seekNotify(dePipe *caller, int mode,
            int fromentry, deOffset_t fromoffset,
            int toentry, deOffset_t tooffset);
    virtual int playNotify(dePipe *caller, struct timeval *playAt);
    virtual int shuttleNotify(dePipe *caller, long numerator,
            unsigned long denominator);
    virtual int setScaleNotify(dePipe *caller, scale_t scale);
    virtual int flushNotify( );
    virtual int eopNotify(dePipe *caller);
    virtual int eofNotify(dePipe *caller);
    virtual int errorNotify(dePipe *caller);
    virtual int eventPendingNotify(dePipe *caller, pendingEvent_t type);
    // control commands called by pipe to indicate the action is being
    // requested on the caller. Derived classes may override to implement
    // treatment of the stream(s). If the filter indicates it does not
    // provide support for this command, the pipe will propagate the
    request
    // upstream until it reaches a filter which indicates it
    // has completed the actions necessary to complete the action.
    virtual int play(dePipe *caller, struct timeval *playAt);
    virtual int pauseatpos(dePipe *caller, int mode,
            int entry, deOffset_t offset);
    virtual int seekatpos(dePipe *caller, int mode, int fromentry,
            deOffset_t fromoffset, int toentry,
            deOffset_t tooffset);
    virtual int shuttle(dePipe *caller, long numerator,
            unsigned long denominator);
    virtual int setSpeed(dePipe *caller, speed_t speed);
    virtual int setScale(dePipe *caller, scale_t scale);
    virtual int flush(dePipe *caller);
    // called to request the filter establish a connection between one of
    // its output ports (source) and an input port on another filter
    virtual dePipe *connect(deOutPort *source, deInPort *target)=0;
    // called to retrieve a buffer for a downstream node. Derived
    // classes which have multiple input or output ports may provide
    // multiple methods to retrieve an upstream buffer; the method
    // to be used is linked to the pipe.
    virtual int pullBuffer(deBuffer **buf, deOffset_t offset=0,
            size_t length=0)=0;
};
class deInlineFilter : public deFilter
{
protected:
    virtual int setInterfaces( );
    virtual int initPortOptions( );
public:
    // derived class should override with filter specific processing
    virtual int processBuffer(deBuffer *buf) { return DE_SUCCESS;}
    // this filter is a single-in, single-out, if one end
    // disconnects, the other end will also be disconnected
    virtual int disconnect(dePort *port);
    // characterize pipeline
    virtual int characterizePipeline(deNode *caller,
            dePipelineProperties *props);
    // called by pipe to retrieve a buffer for a downstream node
    virtual int pullBuffer(deBuffer **buf, deOffset_t offset=0,
            size_t length=0);
```

-continued

```
// called to request the filter establish a connection between one of
// its output ports (source) and an input port on another filter
    virtual dePipe *connect(deOutPort *source, deInPort *target);
};
```

Before a media server can stream media objects, the media objects must first be loaded into the server. Part of this load process often involves parsing the media object to collect information such as the encoding format and file format of the asset, the bit rate requirements of the object which assist the server in properly streaming the object, and information which is required by the client or player, such as the decoder configuration. Because the data in a media file is not necessarily the information that is delivered to the client, but instead is the output of some filter graph, a server should allow parsing filters to be attached to the output channel of a graph so that required information can be collected. The deMediaLoadIf and deMediaParseIf illustrate how filters identify an interface to meet the load and parse requirement of a media server. These interfaces allow the server to be configured such that when a media object of a particular type is loaded, the configured filter can perform the required processing. This processing may include creating new files or simply describing the media object according to the abstraction required by the server. This description may include filters which can be used to parse the media object. The parse filter may be connected directly to the end node which provides the file system interface, or it may be connected at some point within the graph. The interfaces identified by filters which support the load and parse operations are as follows.

```
class deMediaLoadIf {
    // return list of mediafiles to be created
    virtual int enumTargetMediaFiles(int nFiles,
        msStreamProperties_t *props);
    // the server will create the required target files and the load filter
    // will be connected to these media files just as any filter is
    // connected in a graph
    // called after initialization to create all support files
    virtual int buildMediaFiles( );
    // provides description from which an asset metaEntry in the CS
      can be
    // constructed.
    virtual int getMediaDescription (deMediaDescription *des);
};
class deMediaParseIf {
    // Returns list of media objects (and their attributes) contained
    // in this media file.
    virtual int getAttributes(msMediaAttributes_t *attrs)=0;
    // Returns a buffer which lists extended attributes for this
    // media object. These attributes should be specified as
    // label:value pairs and should contain only alphanumeric
    // characters. An example for use of this is to specify media
    // specific attributes which must be communicated to a client.
    virtual int getExtendedAttrs(char *buffer, int *size)=0;
    // Returns a buffer containing codec initialization for this
    // media object. This buffer may contain binary information.
    virtual int getCodecInitInfo(char *buffer, int *size)=0;
};
```

With an understanding of the interfaces which enable filters to function in a generic graph model, how these interfaces are utilized by filter writers and supported by the system will now be detailed. A key feature of the invention, in supporting the requirements of next generation media processing systems as described in the background section of this disclosure, is to accept stream control commands for an output channel and to have the request effected at any one or a plurality of filters along the pipeline which produce data for this pipeline. FIGS. 5 through 8 are used to illustrate the following discussion of how stream control is distributed along the pipeline.

FIG. 5 illustrates how a filter is created and initialized. The process begins (501) at the request of a controller application which may be specific to the graph being created, or may be the generic graph manager which instantiates the graph from a predefined description. The controller application requests that the datapump create the filter (502), which dynamically loads the filter library (503). The controller then initializes (504) the filter causing the filter to create and initialize any ports (505) and interfaces (507) which will be made known to the controller application. The ports, in turn are responsible for configuring connection options to be supported (506). When the filter completes initialization, control is returned to the controller which requests a list of filter ports (508). The filter returns this information (509) to the controller so the controller can query the ports (510) to determine the connection options supported by that port. Connection options include the type of media which may be accepted through the port. The controller uses this information to make decisions on whether a given filter will support connections to other given filters. The controller is then able to open any of the configured ports (512), so that it may later be used in a pipe connection from one filter to another.

Figure 6:
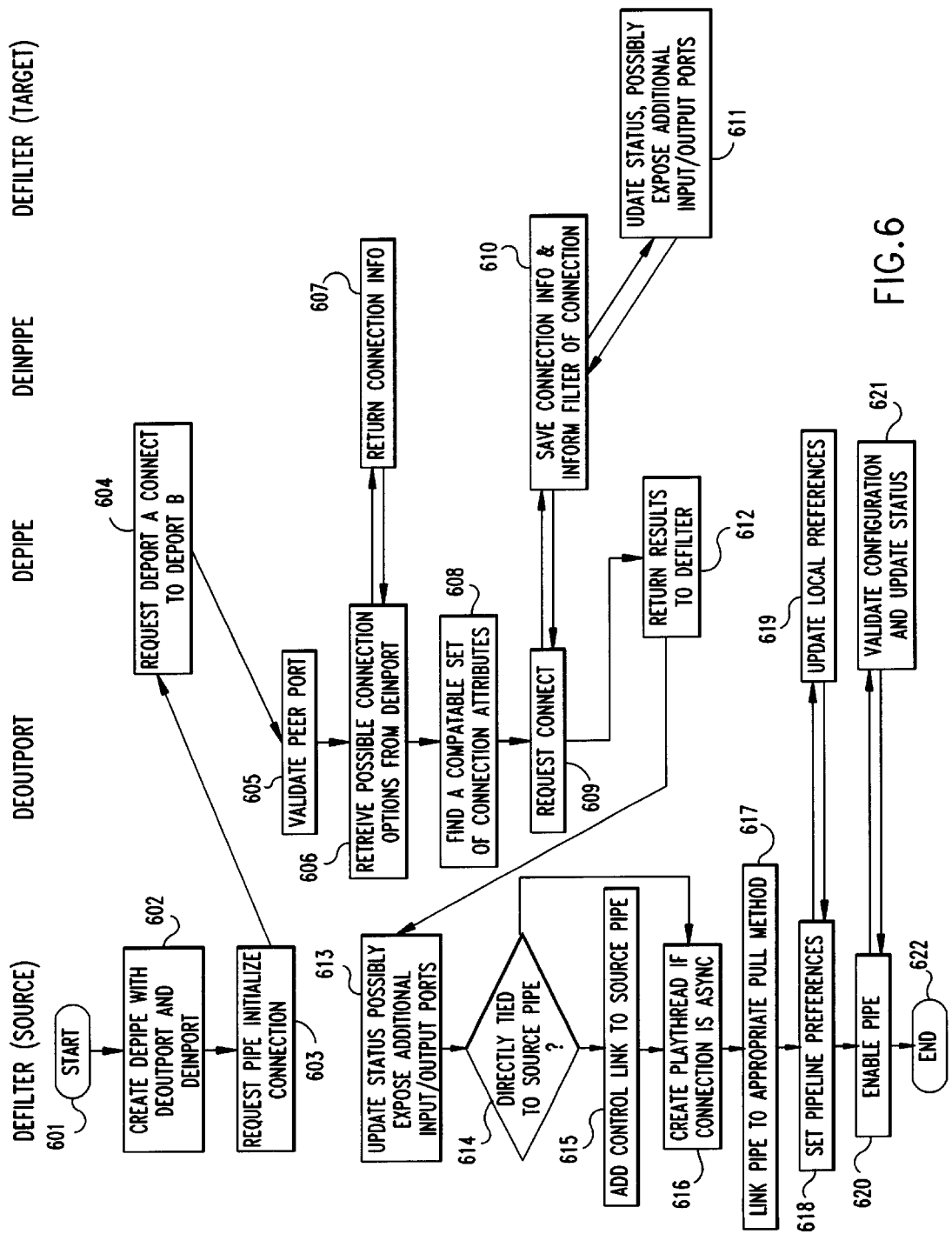
FIG. 6 shows the flow of control when a filter is connected to another filter.

Referring now to FIG. 6, the process of creating a pipe which connects one filter to another filter is illustrated. At the request of a controller application, the process starts at the source end node (601). The source initiates the connection by creating a pipe (602) which will encapsulate the interface between the filters by specifying a single output port and a single input port. The filter initializes the pipe (603) which directs the pipe to contact the output port with a connect request (604). The output port validates the attributes of the peer port (605), and then retrieves (606) possible connection options from the port (607). The output port uses these options to determine an appropriate set of attributes for making the connection (608). Upon determining appropriate connection attributes, the output port informs the input port of the appropriate attributes and requests that the connection be completed (609). The target input port forwards (610) the connection attributes to the owning filter (611) for approval before returning the result to the output port. When control is returned to the output port, the port updates its local state and returns the result to the pipe (612). The pipe then returns control to the filter indicating that the connection has been established. When a filter is notified of a completed connection (613,614), it has the option of identifying additional input and output ports. This is an important feature as some filters may not know the connection options of an output port, such as media type, until after they understand the media type, or some other connection option, of an input port.

Also illustrated in FIG. 6, the filter uses the connection attributes to determine (614) whether an output pipe should be control linked to upstream input pipes. If control of one or more upstream pipes is to be forwarded based on the aggregate state of a group of output pipes, the filter associates the control link (615) with a vector of pipes instead of a single pipe. If a control link is established, any control commands which are not supported directly at the filter can be forwarded, by the pipe, to control linked upstream pipes. The source filter also uses its processing requirements in conjunction with the attributes of the connection to determine whether the pipe should be allowed to retrieve buffers directly from the filter (616). In the case where buffers are retrieved directly from the filter, the method described in this disclosure enables requests from downstream filters to retrieve data by effectively 'reaching through' one or more filters to retrieve the buffer from the filter which is adjacently upstream from this filter, and, as the data is pulled back through this filter, the processing is completed synchronously. The filter enables a pipe to "reach through" it to retrieve buffers by setting the pull method of the pipe to the filter's pull method (617). The ability to reach through a filter enables lightweight filters to add minimal path length and minimal delay to the processing pipeline by eliminating the need for buffer queues, play threads to service those queues, and synchronization mechanisms to ensure the consistent state of these components.

If the source is unable to operate under the constraints of a lightweight filter, this method also enables more complex filters to create a play thread.(referring back to block 616 of FIG. 6) to service one or more pipes. Example filters which would find lightweight operation unsatisfactory are filters which compose buffers based on input from multiple input pipes. If a play thread is created, the filter assigns the output pipe to the play thread, and sets the pull method for the play thread to the method which will be responsible for collecting data from one or more pipes, assembling and processing buffers. The play thread will call this method when the pipe is available to accept data and then push the data into the pipe where it will be queued until requested by a downstream filter. When the pipe is not able to accept data, the play thread will wait for a change in the status before invoking the method to retrieve buffers. Regardless of whether a play thread is created to service an output pipe, the filter may (or may not) establish a control link between the output pipe and one or more input pipes. Note that the filter need only specify the appropriate action. It is not responsible for propagating stream control or data flow, these mechanisms are provided by the supporting infrastructure.

Referring once again to FIG. 6, once the source filter has completed updating its local status, it communicates its pipeline property preferences to the pipe (618, 619). The pipe will use this information when the pipeline is later connected to a target end node, Finally, the filter signals the pipe to move to an enabled state by opening the pipe (620, 621). Even though the connection attributes are complete, once the open has completed (622), the filter can alter the methods used for pulling data through the pipe by pausing and then restarting the pipe. If the target filter is an end node, the target end node will characterize the pipeline (as depicted in FIG. 4). This characterization allows filters and end nodes to reject pipelines on which they are not capable of operating. For pipelines which are acceptable, it allows the filter to glean information about the pipeline, and thereby operate in a more efficient manner.

By default, data will be retrieved in sequence from a given start offset to some ending offset. However, some filters can operate much more efficiently if they are allowed to retrieve data from given offsets for given lengths. For example, filters which are responsible for streaming file formats which interleave multiple media objects, or container files, may require customized access. In that example, the container file format may include instructions indicating how the server should compose the streams from blocks of data at specific offsets within one or more files. This invention supports this requirement by allowing random access, so that buffers of the required offset and length can be retrieved. Note that not all filters are required to support random access as it is expected that most filters which require random access will be connected directly to the (source) end node. If a filter does not support random access, it may still allow a downstream filter to reach through it to an upstream filter that does support random access.

By encapsulating the connection options in the ports and the interface attributes in the pipe, a filter is freed from the burden of having to customize its behavior based on the filters to which it is connected and its position within the graph. A filter need only understand that it will receive, through pipes, both data in the form of buffers, called deBuffers, and control information in the form of server-defined commands (e.g., play, pause, disconnect) or user-defined commands. Commands may be acted upon or rejected by any or multiple filters in a pipeline. Data flows in the downstream direction on the pipeline and control requests flow in the upstream direction on the pipeline. Stream control which is associated with a specific position in the bitstream (e.g., a request to pause a stream at a particular offset) or with some event which is determined by a filter, is effected by flagging the buffer which contains the position in the bitstream or flagging the data which is affected by the event. In this way, deferred control is communicated in a downstream direction so the control operation is completed as the flagged buffer passes through each pipe along the pipeline.

Figure 7:
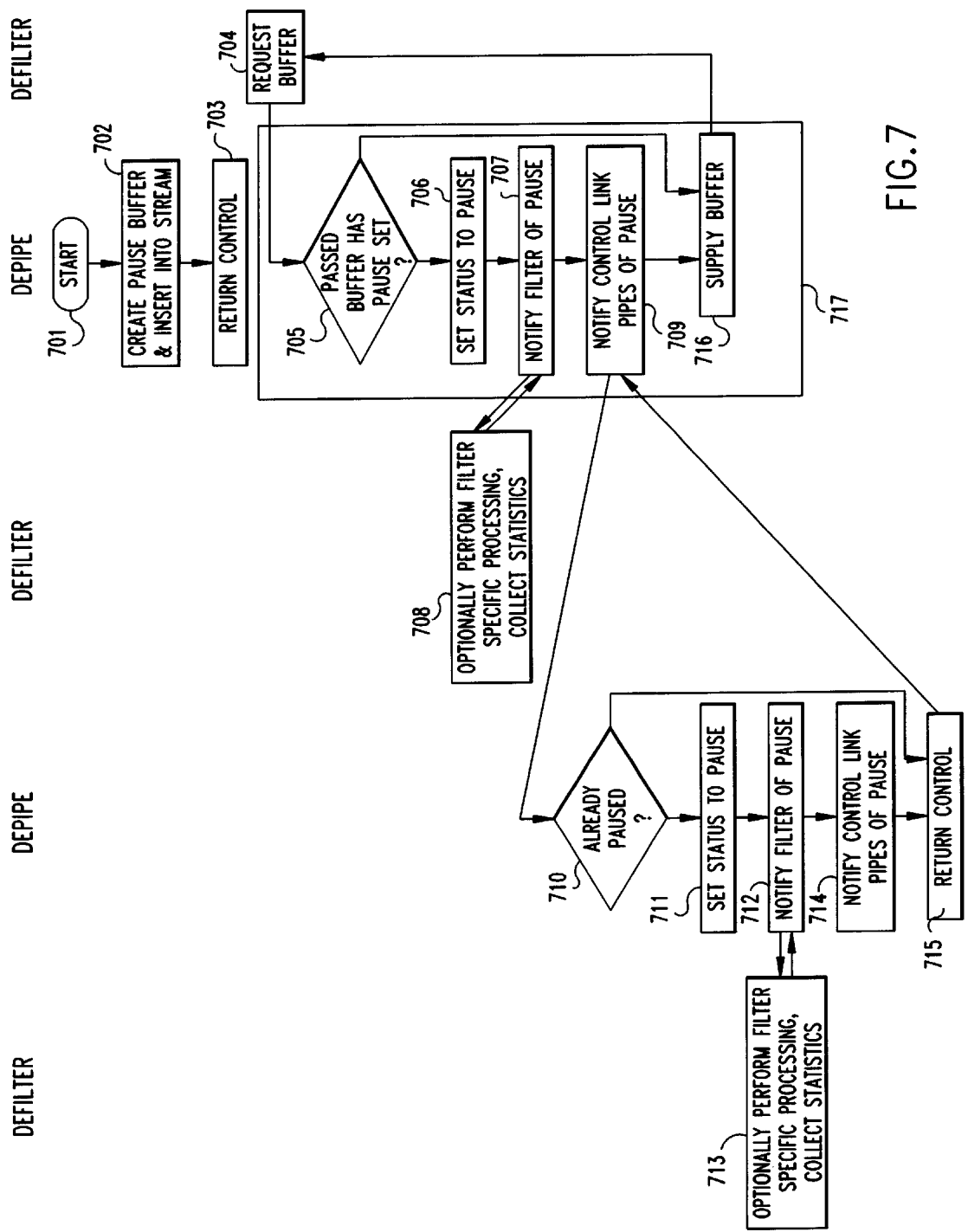
FIG. 7 shows the flow of control when a typical command is applied to the pipeline.
Figure 8:
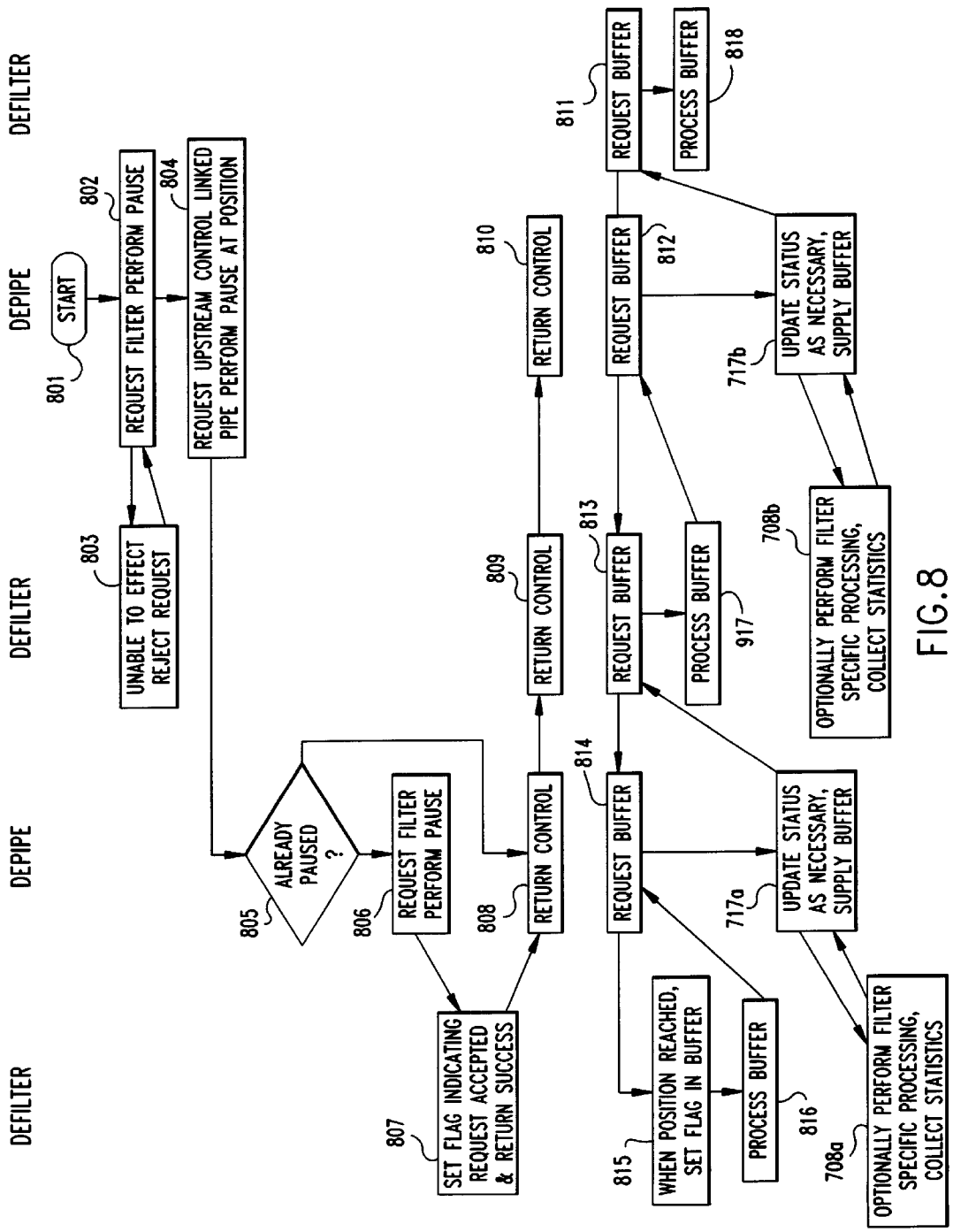
FIG. 8 shows the flow of control when a typical command is distributed across multiple filters within a pipeline.

Once the pipeline is established, the normal course of action is to apply a play command to this output channel which will start the flow of data through the pipeline. Later, other commands, such as pause, setscale, and seek will be applied to the output channel. It is desirable to have any or multiple filters in a pipeline effect this control request. FIGS. 7 and 8 illustrate how stream control is distributed through the pipeline depending on the control requested. These figures illustrate the difference between a stream control command which effected immediately and a stream control command which is deferred. FIG. 7 illustrates server behavior when an immediate pause is requested. The command is applied first to the pipe (701). In this case, the pipe is able to effect the pause command by flagging a buffer (702) and then returning control (703). When the next request for a buffer is issued to the pipe (704), the pipe realizes the pause flag setting in the buffer (705), updates the pipe status (706), and notifies the source filter of the change in state (707) so the source filter may optionally perform filter specific processing such as statistics collection. The pipe is also responsible for propagating the notification of change in state (709) to any control linked pipes. The process is repeated (711, 712, 713, 714, 715) on any upstream pipe which receives the notification, and is not already in a pause state (710). As the pause buffer moves down the pipeline, the pause is effected on each of the pipes it traverses.

FIG. 8 considers the case where the pause is requested for a specific position. For this example assume the pause is being requested at a specific timestamp within the media object which is not supported by all filters in the pipeline. The command is applied to the output channel first (801) and will be propagated upstream until a filter indicates it has successfully completed the command. In this example, the first filter rejects the request (802, 803) so the pipe invokes the command on the control linked upstream pipe (804). If the control linked pipe is not already in the paused state (805), the pause command is forwarded to the pipe's owning filter (806). The filter attached to this pipe is able to handle the request (807), but the position in the bit stream has not yet been reached. The pause request returns immediately (808, 809, 810) and the target filter continues to request and receive buffers (811, 812, 813). When the appropriate position in the bitstream is requested (814) from the filter which is handling the pause command (815), the filter flags the buffer (816). As the buffer traverses each pipe on its way to the output channel, the pipe through which it passes is paused (717a, 717b) before returning the buffer to the downstream filter for processing (917), and the upstream filter is notified of this pause (708a, 708b). Just as in the case of the immediate pause, the notification of the pipeline being paused is propagated upstream until it reaches a segment which is already in the paused state.

All stream control commands which are effected immediately follow the flow illustrated in FIG. 7. Stream control commands which are deferred or must be handled by one or more filters along the pipeline follow the flow illustrated in FIG. 8. This method not only ensures that each segment is informed of changes to the state of the pipeline, but also ensures that commands can be handled by the appropriate filter and thus that control is properly distributed throughout the pipeline.

The innovative method of characterizing the pipeline and distributing stream control provides the flexibility crucial to enabling a variety of processing algorithms in a general purpose media processing system. The following list of example filters helps illustrate this fact.

1. Consider a block encryption filter which requires framed access to ensure data is decrypted just as it is encrypted, i.e., in blocks. In an Internet environment, clients may be connected via TCP or UDP sockets. A TCP socket provides byte stream connections and therefore the access is not framed. If this filter is connected to a pipeline whose output channel is TCP, the characterization will be rejected by pipe connecting this filter, based on the filter's requirements. The end node can choose to express this as an inability to initialize an operational graph, however a more capable end node could provide framing over a TCP connection by inserting begin and end frame markers which would be removed at the client.

2. An authentication filter is an example of a filter which adds a trailer to each block of data. Filters which need to append headers or trailers to a given buffer can express this when the pipeline is characterized. The header and trailer space is a cumulative value representing the information set by filters along the pipeline. The source end node uses this information in generating data buffers by allocating the appropriate space within the buffer so that as the buffer traverses the pipeline, the addition of headers and trailers will not require data copy, but instead will move only the header or trader information into the appropriate position within the buffer.

3. In a general purpose media server, rate controls may be enabled at one or more points. For example, a constant bit rate stream can be paced, or rate limited, by the end node which provides the connection to the networking subsystem. However, variable bit rate, or constant frame rate, streams require understanding of the media format to ensure that data arrives at the client at the appropriate time. Pipeline characterization and distributed stream control allow pacing to be provided at the end node, or by some other filter within the pipeline.

4. Implementing global or local buffer pool policies can be done by the server with the present invention. Because processing introduces the possibility of greater queuing for a stream or graph of streams, a resource management facility may track memory space requirements. Placement of queues within the system-provided pipes ensures control over buffer space resources. Buffers for a pipeline can be drawn from user or kernel space; buffers can be replaced on a per-graph or per-system basis; buffers (filled by source nodes) can even be drawn from a address space specified by the target end node.

5. The inventive method also enables filters to implement stream control by invoking some combination of other stream control commands. Consider algorithms designed to provide trick mode. Trick mode refers to the ability to visually fast-forward, slow down, or reverse video objects while maintaining a constant bit rate to the client. Trick mode algorithms may be implemented by switching between multiple resolutions of a given video object, or by altering the bitstream, (e.g. frame drop or limited transcoding). For the purposes of this description, a request to perform trick mode, regardless of the algorithm, is initiated through the setscale command. The method described allows a single trick mode filter within a graph to effect the set scale command. This can be done wholly within the filter by altering the bitstream. Alternatively, the filter could effect the command by pausing the pipe which provides current resolution of the asset, and initiating playback from a pipe which provides a different resolution.

6. A media presentation requiring secure transmission over a public network to a group of clients which will receive the stream within a secure, private network provides an example of an environment which benefits from the ability to distribute processing modules for a given presentation over multiple systems. The present invention supports instantiating the graph with the encryption filter executing on a media server such that the media stream being transmitted over the public network is secured and the decryption filter executing on a media server within the private client network. This configuration allows the compute intensive decryption processing to be offloaded from the client systems and performed once for the group of clients while not compromising the security of the presentation.

The present invention, as noted above, maintains quality of service support while adding support for graphs of processing modules is described. A key aspect of any streaming media server is the ability to guarantee quality of service to those streams it admits and to reject any streams for which it cannot meet a required level of service or which would cause the server to violate quality of service requirements for streams it has already admitted. Algorithms for ensuring quality of service in media servers are generally classified as deterministic, statistical, performance monitor-based, or some combination of the three. In general, deterministic algorithms sacrifice server capacity for low complexity algorithms and more rigid guarantees. Statistical and performance monitoring algorithms are more complex but generally allow higher utilization at the risk of absolute quality guarantees.

The features of this invention enable system-provided and user-written filters in general purpose media servers while maintaining the ability of the server to guarantee quality of service and admission control. Because the integration of filters do not impose any additional resource management requirements for allocation based on network interface bandwidth, disk placement or bandwidth, or channel bandwidth, these factors are not discussed. The ability to maintain quality of service is realized through multiple levels of the server. First, as described above, buffer requirements are established when a pipeline is characterized. This information can be reported to the resource manager who is responsible for reconciling the memory space requirements of a given pipeline with those available at the server and the amount in use by other pipelines. If the resource manager includes stream prioritization mechanisms, it can provide guidance to the datapump regarding global or local buffer replacement policy. The replacement policy can be especially important in systems where statistical resource management is implemented.

A filter is notified of the quality of the stream to which it contributes through its processStatistics method. The stream quality statistics are reported periodically and reflect that specific reporting period. The information includes the differential between the expected and achieved bit rate, the number of packets dropped at the server, and, if available through mechanisms such as RTCP, the client's perception of stream quality.

The resource management facility should also monitor processing requirements of the datapump. Each filter is responsible for implementing a method which reports properties of the filter such as filter name, version and creator. Also included in these properties is the predicted CPU units requirement for this filter. A CPU unit is an abstract quantity defined by the media server and is independent of any particular hardware platform. The filter's predicted CPU units can be specified as a absolute unit or in terms relative to the bit rate of a particular port of the filter. If the value is relative to a port, the port is identified by its filter-unique port label.

Requiring filters to report properties such as CPU requirements constitutes only a minimum level of assurance that a server can adequately manage resources. In the preferred embodiment, a additional tool is required to assist the server in resource management. In FIG. 2, this tool is noted as the Graph Calibration tool. The graph calibration tool provides a graphical interface which allows users to compose graphs of filters and the interconnections among those filters and then define that graph to the server so that it can later be invoked by a client, by name. An additional application of this tool is to use this instantiation of the graph to collect resource requirements of the graph. This information can be stored with the definition of the graph so that when the graph is requested, the server can use this information to determine whether all resources required by the graph are available on the datapump. A more advanced resource management facility can use this information to distribute the graph over multiple datapumps. The tool can also be used as a calibration mechanism for filters by pushing data through the graph at the required rate and then reporting this more accurate CPU units prediction to filter developers.

Although the present invention has been particularly shown and described with reference to a preferred embodiment, it will be understood by all those skilled in the art that various changes in form and detail may be made without departing from the spirit and the scope of the invention.

What is claimed is:

1. A media processing system, for applying one or more processing algorithms to retrieved digital data to generate at least one media stream in response to a request, comprising:
   a controller for receiving a request;
   at least one data pump component for dynamically creating at least one request-specific data path for data retrieved in response to said request, said at least one data path comprising a plurality of filters for processing said data in accordance with said one or more processing algorithms; and
   at least one component responsive to said controller for creating a request-specific graph for processing data in accordance with said request and for instructing said data pump to retrieve filters and create said at least one request-specific data path in accordance with said request-specific graph.

2. The media processing system of claim 1 wherein said at least one component comprises a controller application.

3. The media processing system of claim 1 wherein said at least one component comprises a graph manager component.

4. The media processing system of claim 3 additionally comprising at least one controller application and wherein one of said graph manager component and said at least one controller application instructs said data pump.

5. The media processing system of claim 1 further comprising a graph calibration component for predefining graphs for processing data.

6. The media processing system of claim 5 wherein said graph calibration component additionally comprises component means for evaluating graphs and for determining data pump requirements for completing said graphs.

7. A method for a media processing system to apply one or more processing algorithms to retrieved digital data to generate at least one media stream in response to a request comprising the steps of:
   receiving a request;
   creating a request-specific graph for processing data in response to said request;
   dynamically creating at least one request-specific data path for data retrieved in response to said request, said at least one request-specific data path comprising a plurality of data processing filters in accordance with said request-specific graph.

8. The method of claim 7 wherein said creating a graph comprises retrieving a predefined graph.

9. The method of claim 7 wherein said dynamically creating at least one data path comprises retrieving a plurality of filters and connecting said filters.

10. The method of claim 9 wherein said connecting said filters comprises the steps of:
    identifying an output port for one of said plurality of filters and an input port for a next successive one of said plurality of filters;
    determining connection attributes for said output port;
    forwarding said connection attributes to said input port; and
    obtaining approval for said connection.

11. The method of claim 10 wherein each of said input and output ports is associated with an owning filter and wherein said obtaining approval for said connection comprises the steps of:
    said input port forwarding connection attributes to its owning filter;
    said owning filter communicating a response to said input port; and
    said input port returning control to said output port.

12. The method of claim 11 further comprising said output port verifying that connection has been completed.

13. The method of claim 11 further comprising identifying at least one of at least one alternative output port and at least one alternative input port for said connection.

14. The method of claim 9 further comprising the step of characterizing said data path to obtain a determined data flow model representing the data flow that said filters and connected ports can handle along said data path.

15. The method of claim 7 further comprising the steps of assembling data packets for transmission along said data path.

16. The method of claim 15 further comprising chaining a plurality of data packets for transmission along said data path.

17. The method of claim 14 wherein said data path begins at a source node filter, said method further comprising providing said determined data flow model to said source node filter.

18. The method of claim 17 further comprising said source node assembling data packets based on said determined data flow model.

19. A method for providing management of the flow of data retrieved by a retrieval entity in response to a request for transmission along a data path comprising a plurality of processing filters and connectors comprising the steps of:

query each of said plurality of processing filters and connectors to obtain a determined request-specific data flow model representing the potential data flow for said data path;

providing said determined request-specific data flow model to said retrieval entity; and assembling retrieved data in accordance with said determined request-specific data flow model.

20. A system for providing management of the flow of data retrieved for transmission along a data path comprising a plurality of processing filters and connectors comprising the steps of:

a query component for querying each of said plurality of processing filters and connectors to obtain a determined request-specific data flow model; and a retrieval entity for assembling retrieved data in accordance with said determined request-specific data flow model.

21. A program storage device readable by machine, tangibly embodying a program of instructions executable by the machine to perform method steps for a media processing system to apply one or more processing algorithms to retrieved digital data to generate at least one media stream in response to a request, said method steps comprising:

receiving a request;

creating a request-specific graph for processing data in response to said request;

dynamically creating at least one request-specific data path for data retrieved in response to said request, said at least one request-specific data path comprising a plurality of data processing filters in accordance with said request-specific graph.

22. A program storage device readable by machine, tangibly embodying a program of instructions executable by the machine to perform method steps for providing management of the flow of data retrieved by a retrieval entity in response to a request for transmission along a data path comprising a plurality of processing filters and connectors, said method comprising the steps of:

querying each of said plurality of processing filters and connectors to obtain a determined request-specific data flow model representing the potential data flow for said data path;

providing said determined request-specific data flow model to said retrieval entity; and assembling retrieved data in accordance with said determined request-specific data flow model.

\* \* \* \* \*